United States Patent
Meyer

(10) Patent No.: US 6,431,661 B1
(45) Date of Patent: Aug. 13, 2002

(54) FORCE FEEDBACK AND PRESSURE EQUALIZATION BRAKE SYSTEM

(75) Inventor: Douglas Gerard Meyer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/695,347

(22) Filed: Oct. 24, 2000

(51) Int. Cl.⁷ .............................................. B60T 13/00
(52) U.S. Cl. ........................................ 303/9.61; 303/10
(58) Field of Search ........................... 303/9.61, 10, 50, 303/52, 59, 66, 86, 115.4, 116.1; 188/352; 91/6; 180/307, 403, 442

(56) References Cited

U.S. PATENT DOCUMENTS

| | | | |
|---|---|---|---|
| 4,183,419 A | | 1/1980 | Henn et al. .................. 180/243 |
| 4,809,586 A | * | 3/1989 | Gage et al. .................... 91/461 |
| 4,898,078 A | | 2/1990 | Gage et al. .................... 91/524 |
| 4,949,802 A | * | 8/1990 | Gage ............................ 180/132 |
| 5,662,390 A | * | 9/1997 | Mies et al. ..................... 303/10 |
| 5,709,282 A | * | 1/1998 | Akira et al. ................. 180/307 |
| 5,895,099 A | * | 4/1999 | Diecke et al. ............. 303/9.61 |
| 6,142,582 A | * | 11/2000 | Karlsson .................. 303/113.2 |

* cited by examiner

Primary Examiner—Christopher P. Schwartz

(57) ABSTRACT

A work vehicle is provided with a brake system actuated by depressing either the left pedal or the right pedal. The brake system comprises two parallel brake circuits. The first brake circuit has a first brake actuator, a first hydraulic line, a first flow regulating portion of a tandem brake valve and a first accumulator. The second brake circuit has a second brake actuator, a second hydraulic line, a second flow regulating portion of the tandem brake valve and a second accumulator. To equalize the hydraulic pressure applied to the first and second brake actuators, an equalizer hydraulic line having an orifice extends between the first and second hydraulic lines. A force feedback hydraulic circuit is hydraulically positioned between the first and second hydraulic lines. The force feedback circuit comprises a first force feedback hydraulic line, a second force feedback hydraulic line and a force feedback hydraulic actuator. The first feedback line extends between the first and second hydraulic lines. The second feedback line extends from the first feedback line to the feedback actuator. The feedback actuator is mounted to the tandem brake valve. The first feedback line is provided with a shuttle check valve having a first inlet, a second inlet and an outlet. The first inlet is in fluid communication with the first hydraulic line and the second inlet is in fluid communication with the second hydraulic line. The outlet is hydraulically coupled to the second feedback line.

12 Claims, 1 Drawing Sheet

FORCE FEEDBACK AND PRESSURE EQUALIZATION BRAKE SYSTEM

BACKGROUND OF THE INVENTION

1. Field of the Invention

The present invention is directed to a brake system having a tandem brake valve that is provided with a pressure equalization circuit and a force feedback circuit.

2. Description of the Prior Art

Four wheel drive loaders are articulated work vehicles having a forward mounted loader bucket for moving bulk materials. Four wheel drive loaders have a supporting structure comprising a front frame section having two front wheels and a rear frame section having two rear wheels. The front and rear wheels are all driven and are all provided with brakes.

The brake system for a four-wheel drive loader has a left pedal and a right pedal. Both pedals actuate the front brakes and the rear brakes. Typically when the left pedal is depressed, a clutch cutoff signal is sent to the transmission declutching the transmission. The operator can then use his right foot to depress the accelerator pedal accelerating the engine and increasing hydraulic fluid flow to the work implements. Such a two-footed operation reduces cycle time. Some operators prefer to operate the loader with only the right foot.

These brake systems may comprise parallel brake circuits for the front and rear brakes. The flow of pressurized hydraulic fluid through these circuits may be controlled by the tandem brake valve. The tandem brake valve has a first flow regulating portion to control the flow of pressurized hydraulic fluid to the front brakes and a second flow regulating portion controlling the flow of hydraulic fluid to the rear brakes. Each of the brake circuits may be provided with a hydraulic pressure accumulator to maintain pressure in the circuits even if the source of pressurized hydraulic fluid fails. One problem with these systems is the unequal pressure in the brake circuits causes unequal wear of the brake components. For example, the front tires and brake pads may wear more quickly if the hydraulic pressure in the front brake circuit is consistently higher than the hydraulic pressure in the rear brake circuit.

SUMMARY

A work vehicle having a work implement is provided with a supporting structure having front wheel and rear wheels. The work vehicle is provided with a brake system having a left pedal and a right pedal. The brake system comprises two parallel brake circuits for controlling the front brakes and the rear brakes. The front and rear brakes are triggered by depressing the right or left brake pedal. The first brake circuit has a first brake actuator, a first hydraulic line, a first flow regulating portion of a tandem brake valve and a first accumulator. The second brake circuit has a second brake actuator, a second hydraulic line, a second flow regulating portion of the tandem brake valve and a second accumulator. The first brake circuit controls the application of the front brakes and the second brake circuit controls the application of the rear brakes.

To equalize the hydraulic pressure applied to the first and second brake actuators, an equalizer hydraulic line extends between the first and second hydraulic lines. The equalizing hydraulic line is provided with an orifice for limiting hydraulic fluid flow between the first and second hydraulic lines if one of the lines fails.

A force feedback hydraulic circuit is hydraulically positioned between the first and second hydraulic lines. The force feedback circuit comprises a first force feedback hydraulic line, a second force feedback hydraulic line and a force feedback hydraulic actuator. The first feedback line extends between the first and second hydraulic lines. The second feedback line extends from the first feedback line to the feedback actuator. The feedback actuator is mounted to the tandem brake valve and provides a feedback force to the operator by resisting the depression of the pedals. The first feedback line is provided with a shuttle check valve having a first inlet, a second inlet and an outlet. The first inlet is in fluid communication with the first hydraulic line and the second inlet is in fluid communication with the second hydraulic line. The outlet is hydraulically coupled to the second feedback line.

DETAILED DESCRIPTION

Figure 1:
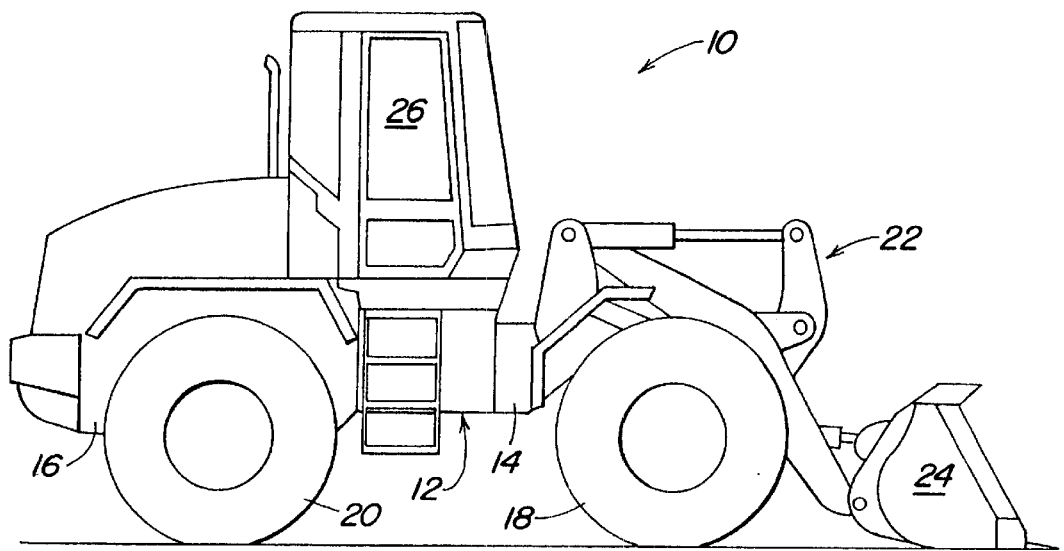
FIG. 1 is a side view of a four-wheel drive loader.
Figure 2:
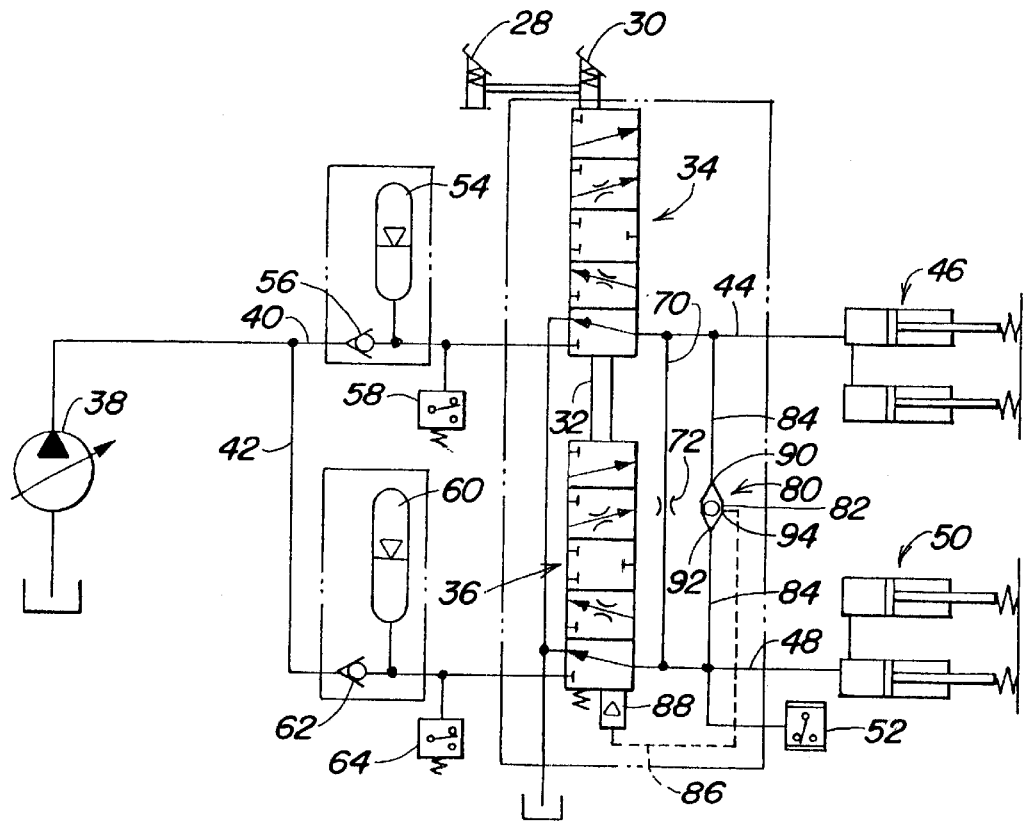
FIG. 2 is a hydraulic schematic of the brake system.

The work vehicle 10 illustrated in FIG. 1 is a four-wheel drive loader. Although the present invention is described as being used on a four-wheel drive articulated loader, it can be used on a variety of work vehicles. The work vehicle 10 is provided with a supporting structure 12 having a front frame section 14 and a rear frame section 16. The frame sections 14 and 16 are pivotally coupled to one another by a vertical pivot. The two frame sections 14 and 16 can articulate with respect to one another to steer the vehicle 10. The front frame section 14 is provided with front wheels 18 and the rear frame section 16 is provided with rear wheels 20. The vehicle 10 is powered by an internal combustion engine that drives the front and rear wheels 18 and 20. The internal combustion engine also drives hydraulic pumps providing pressurized hydraulic fluid. The front frame section 14 is also provided with a work implement. The work implement being a loader assembly comprising a loader linkage 22 for manipulating a loader bucket 24. The operation of the vehicle 10 is controlled from an operator's cab 26.

The operator's cab is provided with left and right brake pedals 28 and 30. Depressing either of these brake pedals actuates all of the brakes braking all of the wheels 18 and 20. The brake pedals 28 and 30 are operatively coupled to a tandem brake valve 32. The brake valve 32 has a first flow regulating portion 34 and a second flow-regulating portion 36. Both flow regulating portions 34 and 36 are coupled to one another making brake valve 32 a tandem valve. The internal combustion engine drives a hydraulic pump that comprises a source of pressurized hydraulic fluid 38. Pressurized hydraulic fluid from the source of pressurized hydraulic fluid is directed through supply hydraulic lines 40 and 42 to the first flow-regulating portion 34 and the second flow regulating portion 36, respectively.

From the first flow regulating portion 34 pressurized fluid is directed through a first hydraulic line 44 to a first brake actuator 46. Brake actuator 46 comprises two hydraulic cylinders that are used to apply left and right front brakes braking the front wheels 18 of the vehicle 10. Similarly, the second flow-regulating portion 36 directs pressurized fluid through second hydraulic line 48 to second brake actuator 50. The second hydraulic line 48 is in fluid communication with pressure sensing switch 52 which is used to trigger the exterior brake indicator lights of the vehicle 10.

Hydraulically positioned on hydraulic supply line 40 between the source of pressurized hydraulic fluid 38 and the first flow regulating portion 34 is a first hydraulic pressure accumulator 54 and associated a check valve 56. The first brake accumulator maintains pressure in the first brake circuit defined by the first flow regulating portion 34, first hydraulic line 44 and the first brake actuator 46. A first pressure sensing switch 58 in fluid communication with supply hydraulic line 40 triggers warning lights located inside the operator's cab 26 when hydraulic pressure in the first brake circuit is low. A second hydraulic pressure accumulator 60 and associated check valve 62 is hydraulically positioned between the source of pressurized hydraulic fluid 38 and the second flow regulating portion 36. The second brake accumulator 60 maintains pressure in the second brake circuit defined by the second flow regulating portion 36, second hydraulic line 48 and the second brake actuator 50. A second pressure sensing switch 64 in fluid communication with supply hydraulic line 42 triggers warning lights located inside the operator's cab 26 when hydraulic pressure in the second brake circuit is low. A clutch cutoff switch operatively coupled to the pedals 28 and 30 declutches the vehicle transmission when the brake pedals are depressed.

The use of parallel first and second hydraulic circuits with a tandem brake valve is known in the art. The present invention is directed to adding a brake pressure equalization 70 line and a force feedback line 80 having a shuttle check valve 82 between the first and second hydraulic lines 44 and 48. The pressure equalization line 70 is provided with an orifice 72. If hydraulic pressure is higher in the first hydraulic line 44 versus the second hydraulic line 48, the hydraulic pressure is balanced by the pressure equalization line 70. If hydraulic line 48 fails, the rate at which hydraulic fluid can leak out of the first brake circuit to the failing second hydraulic line 48 is limited by the orifice 72.

The force feedback hydraulic circuit 80 comprises a first force feedback hydraulic line 84, a second force feedback hydraulic line 86, and a force feedback hydraulic actuator 88. The first force feedback hydraulic line extends between the first hydraulic line 44 and the second hydraulic line 48. The second force feedback hydraulic line extends between the first force feedback hydraulic line 84 and the force feedback actuator 88. The force feedback actuator 88 is mounted to the tandem valve 32 and provides a feedback force that can be sensed by the operator through a resistance force in the pedals 20 and 30.

The first force feedback hydraulic line 84 is provided with a shuttle check valve 82. The shuttle check valve 82 is provided with a first inlet 90 in fluid communication with the first hydraulic line, and a second inlet 92 in fluid communication with the second hydraulic line 48. The shuttle check valve 82 is also provided with an outlet 94 that is coupled to the second force feedback hydraulic line 86. If the second hydraulic line 48 fails, the shuttle check valve will be shifted by the hydraulic pressure and close off inlet 92 preventing hydraulic fluid from leaking from the first brake circuit to the failed hydraulic line 48. However, pressurized fluid from the first hydraulic circuit will still pass through outlet 94 to the second force feedback hydraulic line 86 providing pressurized fluid to the force feedback actuator 88.

The present invention should not be limited to the above-described embodiment, but should be limited solely by the claims that follow.

I claim:

1. A brake system for a work vehicle having a supporting structure and ground engaging wheels for propelling the vehicle, the brake system comprising:

a source of pressurized fluid;

a tandem brake valve having a first flow regulating portion and a second flow-regulating portion, the tandem brake valve having two operator controlled elements for shifting the tandem brake valve;

a first brake circuit being in fluid communication with the source of pressurized fluid and the first flow regulating portion of the tandem brake valve, the first brake circuit being provided with a first braking actuator for braking the vehicle, a first hydraulic line extending between the first brake actuator and the first flow regulating portion of the tandem brake valve;

a second brake circuit being in fluid communication with the source of pressurized fluid and the second flow regulating portion of the tandem brake valve, the second brake circuit being provided with a second braking actuator for braking the vehicle, a second hydraulic line extending between the second brake actuator and the second flow regulating portion of the tandem brake valve;

whereby a pressure equalization hydraulic line extends between the first hydraulic line and the second hydraulic line for equalizing pressure between the first and second hydraulic actuators.

2. A brake system as defined by claim 1 wherein the pressure equalization line is provided with an orifice.

3. A brake system as defined by claim 2 further comprising a force feedback hydraulic circuit for providing force feedback to an operator through the tandem brake valve to the two operator controlled elements, the force feedback circuit comprising a first force feedback hydraulic line extending between the first hydraulic line and the second hydraulic line and a second force feedback hydraulic line extending between the first force feedback hydraulic line and a force feedback hydraulic actuator located on the tandem brake valve.

4. A brake system as defined by claim 3 wherein the first force feedback hydraulic line is provided with a shuttle check valve, the shuttle check valve is provided with a first inlet coupled to the first force feedback hydraulic line and in fluid communication with the first hydraulic line; a second inlet coupled to the first force feedback hydraulic line in fluid communication with the second hydraulic line and an outlet which is coupled to the second force feedback hydraulic line.

5. A brake system as defined by claim 4 wherein the first brake circuit is provided with a first pressure accumulator and the second brake circuit is provided with a second pressure accumulator.

6. A brake system as defined by claim 5 wherein the first pressure accumulator is hydraulically positioned between the source of hydraulic pressure and the first portion of the tandem brake valve and the second pressure accumulator is hydraulically positioned between the source of pressurized fluid and the second portion of the tandem brake valve.

7. A brake system as defined by claim 6 wherein the ground engaging wheels comprise a front pair of wheels and a rear pair of wheels, the first actuator brakes the front pair of wheels and the rear pair of wheels is braked by the rear actuator.

8. A brake system for a work vehicle having a supporting structure and ground engaging wheels for propelling the vehicle, the brake system comprising:

a source of pressurized fluid;

a tandem brake valve having a first flow regulating portion and a second flow-regulating portion, the tandem brake valve having two operator controlled elements for shifting the tandem brake valve;

a first brake circuit being in fluid communication with the source of pressurized fluid and the first flow regulating portion of the tandem brake valve, the first brake circuit being provided with a first braking actuator for braking the vehicle, a first hydraulic line extending between the first brake actuator and the first flow regulating portion of the tandem brake valve;

a second brake circuit being in fluid communication with the source of pressurized fluid and the second flow regulating portion of the tandem brake valve, the second brake circuit being provided with a second braking actuator for braking the vehicle, a second hydraulic line extending between the second brake actuator and the second flow regulating portion of the tandem brake valve;

a force feedback hydraulic circuit for providing force feedback to an operator through the tandem brake valve to the two operator controlled elements, the force feedback circuit comprising a first force feedback hydraulic line extending between the first hydraulic line and the second hydraulic line and a second force feedback hydraulic line extending between the first force feedback hydraulic line and a force feedback hydraulic actuator located on the tandem brake valve, the first force feedback hydraulic line is provided with a shuttle check valve, the shuttle check valve is provided with a first inlet coupled to the first force feedback hydraulic line and in fluid communication with the first hydraulic line; a second inlet coupled to the first force feedback hydraulic line in fluid communication with the second hydraulic line and an outlet which is coupled to the second force feedback hydraulic line.

9. A brake system as defined by claim 8 further comprising a pressure equalization hydraulic line extending between the first hydraulic line and the second hydraulic line for equalizing pressure between the first and second hydraulic actuators.

10. A brake system as defined by claim 9 wherein the first brake circuit is provided with a first pressure accumulator and the second brake circuit is provided with a second pressure accumulator.

11. A brake system as defined by claim 10 wherein the first pressure accumulator is hydraulically positioned between the source of hydraulic pressure and the first portion of the tandem brake valve and the second pressure accumulator is hydraulically positioned between the source of pressurized fluid and the second portion of the tandem brake valve.

12. A brake system as defined by claim 11 wherein the ground engaging wheels comprise a front pair of wheels and a rear pair of wheels, the first actuator brakes the front pair of wheels and the rear pair of wheels is braked by the rear actuator.

* * * * *